US012643704B2

(12) United States Patent
Owoc

(10) Patent No.: US 12,643,704 B2
(45) Date of Patent: Jun. 2, 2026

(54) BOTTLE FOR STORAGE OF SMALL VOLUMES OF CARBONATED BEVERAGES

(71) Applicant: Energy Beverages LLC, Corona, CA (US)

(72) Inventor: John H. Owoc, Southwest Ranches, FL (US)

(73) Assignee: Energy Beverages LLC, Corona, CA (US)

( * ) Notice: Subject to any disclaimer, the term of this patent is extended or adjusted under 35 U.S.C. 154(b) by 0 days.

(21) Appl. No.: 17/380,107

(22) Filed: Jul. 20, 2021

(65) Prior Publication Data

US 2023/0044870 A1 Feb. 9, 2023

(51) Int. Cl.

| | |
|---|---|
| ***B65D 1/02*** | (2006.01) |
| ***B29K 67/00*** | (2006.01) |
| ***B29K 77/00*** | (2006.01) |
| ***B29L 31/00*** | (2006.01) |
| ***B32B 1/00*** | (2024.01) |
| ***B32B 27/08*** | (2006.01) |
| ***B32B 27/34*** | (2006.01) |
| ***B32B 27/36*** | (2006.01) |

(52) U.S. Cl.

CPC .............. *B65D 1/0215* (2013.01); *B32B 1/00* (2013.01); *B32B 27/08* (2013.01); *B32B 27/34* (2013.01); *B32B 27/36* (2013.01); *B65D 1/0246* (2013.01); *B65D 1/0276* (2013.01); *B29C 2949/3032* (2022.05); *B29K 2067/003* (2013.01); *B29K 2077/00* (2013.01); *B29K 2995/0067* (2013.01); *B29L 2031/7158* (2013.01); *B32B 2250/03* (2013.01); *B32B 2250/24* (2013.01); *B32B 2250/40* (2013.01); *B32B 2307/7242* (2013.01); *B32B 2439/60* (2013.01); *B32B 2439/70* (2013.01)

(58) Field of Classification Search

None

See application file for complete search history.

(56) References Cited

U.S. PATENT DOCUMENTS

| | | | | |
|---|---|---|---|---|
| 2007/0224375 A1* | 9/2007 | Sato | B32B 27/08 | |
| | | | 264/519 | |
| 2020/0283185 A1* | 9/2020 | Ritzen | B65D 1/0223 | |

OTHER PUBLICATIONS

"Slim 2010 Shelf-Life International Meeting," edited by Cristina Nerin, et al., The Italian Scientific Group of Food Packaging; Italian Journal of Food Science; Jun. 2010; 7 pages.

(Continued)

*Primary Examiner* — Thomas J Kessler

(74) *Attorney, Agent, or Firm* — Knobbe, Martens, Olson & Bear, LLP

(57) ABSTRACT

A blow-molded bottle for a carbonated beverage includes a threaded mouth, a cylindrical side wall, a bottom, and a standard fill capacity of 37.5 mL to 105 mL. The bottle is blow-molded from a laminated preform including an outer layer formed from polyethylene terephthalate, an intermediate gas barrier layer formed from a polyamide comprising a dicarboxylic acid component and a diamine component comprising m-xylylenediamine, and an inner layer comprising polyethylene terephthalate. The laminated preform may weigh from about 4 to 16 grams. The polyamide layer provides the bottle with excellent resistance to carbon dioxide, hydrogen, and nitrogen transmission and prevents the degradation of nutrients and flavors.

7 Claims, 4 Drawing Sheets

(56) References Cited

OTHER PUBLICATIONS

Salman Alfarisi, et al., "Carbon Footprint and Life Cycle Assessment of PET Bottle Manufacturing Process," ResearchGate; Jan. 2019; 9 pages.
Kodapak PET, "Thermoplastic Polyester and Shelf Life of Carbonated Beverages," Container Plastics, 2009. 32 pages.
"SLIM 2006 Shelf-life International Meeting," edited by Giuseppe Muratore; Italian Journal of Food Science; Jun. 2006; 4 pages.
Polymer Properties Database; Nylon Films; 2 pages.
Iman Soltani, et al., "Nanotechnological Strategies Yielding High-Barrier Plastic Food Packaging," Food Packaging, 2017, pp. 1-43. 43 pages.
Tsung-Yen Tsai, et al., "Permeability property of Nylon 6 nanocomposite membranes with various clay minerals," Elsevier, 2008; 8 pages.

* cited by examiner

BOTTLE FOR STORAGE OF SMALL VOLUMES OF CARBONATED BEVERAGES

TECHNICAL FIELD

Various embodiments disclosed herein relate generally to a bottle having a small volume, or a high ratio of surface area to volume, with a high resistance to $CO_2$ transmission.

BACKGROUND

Carbonated beverages are frequently packaged in plastic bottles, such as polyethylene terephthalate bottles. Over time, carbon dioxide escapes through the wall of the bottle, rendering the product undesirable to the consumer and reducing its shelf life ("Kodapak PET Thermoplastic Polyester and Shelf Life of Carbonated Beverages," Eastman, FIGS. 1-4, 7, and 8; see: http://www.burchamintl.com/papers/petpapers/Eastman %20-%20Gas %20Permeability%20of%20PET.pdf; Coriolani et al., *Italian Journal of Food Science*, January 2007, pp. 453-455). Other gasses such as hydrogen or nitrogen, nutrients, etc. may also degrade and/or escape. Bottles containing larger volumes of a carbonated beverage ranging from 473 mL to 2000 mL or greater maintain shelf life in a polyethylene terephthalate bottles that are typically measured in months (Licciardello et al., *Italian Journal of Food Science*, January 2011, pp. 115-117). However, bottles containing small volumes of a carbonated beverage ranging from 300 mL or less, 250 mL or less, 200 mL or less, 150 mL or less, or 100 mL or less, or 74 mL or less, or 60 mL or less or 37 mL or less maintain a shelf life frequently measured in weeks. While the shelf life of a carbonated beverage in a small bottle may be extended by increasing the thickness of the wall of the bottle, the extended shelf life gained from this increase in bottle wall thickness is insignificant and has many drawbacks and therefore, impractical for CPG (consumer product goods) commercialization of carbonated beverages. The increased costs associated with production of thicker bottles is economically undesirable. Most importantly, reducing the carbon footprint and environmental impact associated with production of thinner wall plastic bottles, a massive benefit of this invention, results in using lighter weight and less plastic, consequently, meeting local, national and global sustainability initiatives (Alfarisi et al., ICCSET 2018, October 25-26, Kudus, Indonesia).

Furthermore, increasing the thickness of the wall of the bottle has very little impact on maintaining and containing for example, carbon dioxide or hydrogen gas inside lower volume capacity carbonated plastic bottles.

It is important to meet consumer expectations for sustainability, convenience, flavor and functionality with, "Innovation that exceeds all expectation!"

In view of the foregoing, it is desirable to develop improved bottles for packaging small volumes of carbonated beverages that overcome the aforementioned challenges. More specifically, it is desirable to develop improved bottles which significantly extend shelf life of carbonated beverages by reducing permeation of carbon dioxide, hydrogen, nitrogen and/or other gases, and also maintaining nutrient potency, flavor and function etc. through the bottle walls.

SUMMARY

In light of the need discussed above for a high resistance to carbon dioxide, hydrogen, and nitrogen gas transmission, and to prevent degradation of nutrients and flavors, in bottles having a high ratio of surface area to volume, a brief summary of various embodiments disclosed herein is presented. Some simplifications and omissions may be made in the following summary, which is intended to highlight and introduce some aspects of the various disclosed embodiments, but not to limit the scope of the invention. Detailed descriptions of embodiments adequate to allow those of ordinary skill in the art to make and use the inventive concepts will follow in later sections.

Various embodiments disclosed herein relate to a blow-molded bottle for a carbonated beverage with a standard fill capacity of 30 mL to 300 mL, 30 mL to 120 mL, 45 mL to 250 mL, 60 mL to 200 mL, 75 mL to 150 mL, or 75 mL to 105 mL. In certain embodiments, the bottle includes a mouth; a cylindrical side wall; an optional shoulder connecting the mouth to the side wall, and a bottom. The bottom may have a punt, or an indentation or dimple. In various embodiments, the bottle is blow-molded from a laminated preform weighing from 12 to 17 grams, from 13 to 16 grams, from 14 to 15.5 grams, or about 15 grams. In other embodiments, the bottle is blow-molded from a laminated preform weighing from about 4 to 17 grams. The laminated preform includes:

- an outer layer formed from polyethylene terephthalate,
- an intermediate gas barrier layer formed from a polyamide comprising a dicarboxylic acid component and a diamine component comprising m-xylylenediamine; and
- an inner layer comprising polyethylene terephthalate,
- where the intermediate gas barrier layer may provide 3% to 7% of the total mass of the preform.

In various embodiments, the blow-molded bottle has superior resistance to carbon dioxide, hydrogen, and nitrogen transmission, and prevents the degradation of nutrients and flavors, when compared to a comparative bottle with a standard fill capacity of 75 mL to 105 mL, where the comparative bottle is blow-molded from a non-laminated preform including a single polyethylene terephthalate layer, where the non-laminated preform has a weight of 13 grams to 22 grams, from 14.5 to 21 grams, 14.5 to 18 grams, from 15 to 18 grams, from 15 to 17.5 grams, or 13 to 16 grams.

In various embodiments, the blow-molded bottle has superior resistance to carbon dioxide, hydrogen, and nitrogen transmission, and prevents the degradation of nutrients and flavors, when compared to a comparative bottle with a standard fill capacity of 75 mL to 105 mL, where:

- the comparative bottle is formed from a non-laminated preform including a single polyethylene terephthalate layer, and
- the wall and base of the blow-molded bottle contain 10% to 50%, 12% to 47%, 20% to 41%, or 30% to 41% less plastic than the wall and base of the comparative bottle.

Various embodiments disclosed herein relate to a bottle for a carbonated beverage with a standard fill capacity of 30 mL, to 120 mL, blow-molded from a laminated preform weighing from about 4 to 17 grams, where the laminated preform includes an outer layer and an inner layer formed from polyethylene terephthalate, and an intermediate gas barrier layer between the outer and inner layers. The intermediate gas barrier layer is formed from a polyamide including:

- a dicarboxylic acid component including an aliphatic dicarboxylic acid having an even number of between 6 and 10 carbon atoms, an isomer of benzenedicarboxylic acid, or a mixture thereof; and
- a diamine component comprising m-xylylenediamine.

In various embodiments, the dicarboxylic acid component of the polyamide comprises adipic acid in combination with an isomer of benzenedicarboxylic acid. The dicarboxylic acid component may be 40% to 100%, 50% to 90%, 60% to 80%, or about 70% adipic acid, and from 0% to 60%, 10% to 50%, 20% to 40%, or about 30% of terephthalic acid, isophthalic acid, or a mixture thereof. The dicarboxylic acid component may be 100% adipic acid.

In various embodiments, the polyamide is a polymer having formula I, where n is an integer:

I

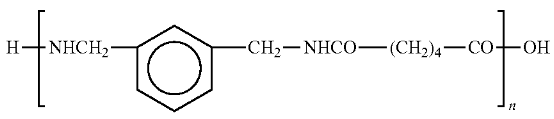

Various embodiments disclosed herein relate to a method of making a blow-molded bottle for a carbonated beverage, by:

- placing a laminated preform in a mold cavity having a volume of 37.5 mL to 105 mL; and
- blow molding the laminated preform against an internal surface of the mold cavity to form the blow-molded bottle. In various embodiments, the finished bottle may have a standard fill capacity of 37.5 mL to 105 mL. The laminated preform includes an outer layer formed from polyethylene terephthalate, an intermediate gas barrier layer formed from a polyamide comprising a dicarboxylic acid component and a diamine component comprising m-xylylenediamine; and an inner layer comprising polyethylene terephthalate.

The method of making a blow-molded bottle may also include a step of producing the laminated preform, by:

- providing a skin material melt stream comprising polyethylene terephthalate and a core material melt stream comprising the polyamide to a co-injection hot runner molding system comprising a nozzle and a mold;
- passing the skin material melt stream and the core material melt stream through the nozzle, wherein the nozzle defines:
  - an inner melt passage and an outer melt passage for receiving the skin material melt stream, and
  - an intermediate melt passage for receiving the core material melt stream;
- combining the skin material melt stream from the inner melt passage, the core material melt stream from the intermediate melt passage, and the skin material melt stream from the outer melt passage to produce a combined melt stream; and
- injecting the combined melt stream into the mold to form the laminated preform.

Various embodiments disclosed herein relate to storage of a carbonated beverage for an extended period of time, e.g., up to three months, up to four months, up to six months, or up to 12 months, without loss of carbonation in a blow-molded bottle with a standard fill capacity of 37.5 mL to 105 mL. The carbonated beverage may be stored in a bottle blow-molded from a laminated preform including:

- an outer layer formed from polyethylene terephthalate,
- an intermediate gas barrier layer formed from a polyamide comprising a dicarboxylic acid component and a diamine component comprising m-xylylenediamine; and
- an inner layer comprising polyethylene terephthalate,
- where the intermediate gas barrier layer may provide 3% to 7% of the total mass of the preform.

It should be apparent that, in this manner, various exemplary embodiments enable production and use of a bottle combining a small volume, or a high ratio of surface area to volume, a high resistance to carbon dioxide, hydrogen, and nitrogen transmission as well as being able to prevent the degradation of nutrients and flavors.

BRIEF DESCRIPTION OF THE DRAWINGS

In order to better understand various exemplary embodiments, ence is made to the accompanying drawings, wherein.

DETAILED DESCRIPTION

Figure 1:
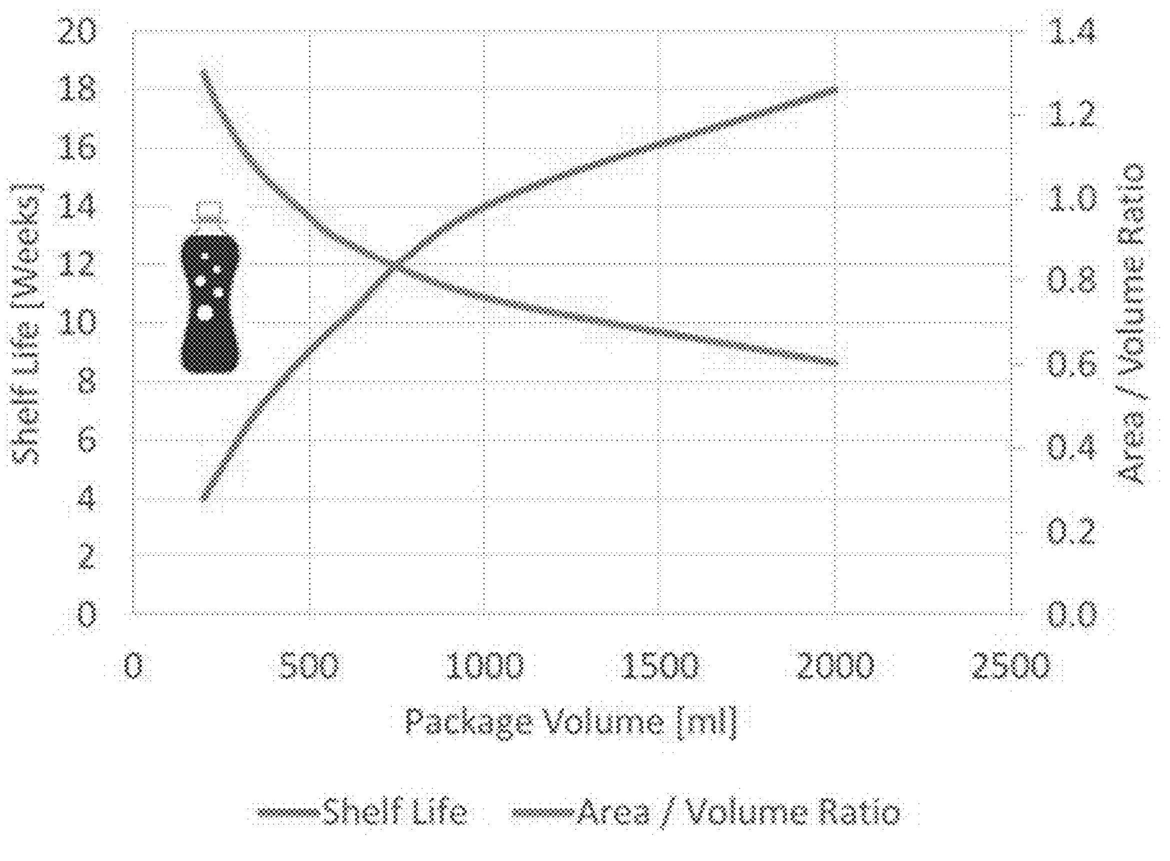
FIG. 1 illustrates the shelf life of a bottled carbonated beverage as a function of bottle volume.

Referring now to the drawings, in which like numerals refer to like components or steps, there are disclosed broad aspects of various exemplary embodiments.

Bottles with a polymeric wall made of a polyester monolayer, e.g., a monolayer of polyalkylene terephthalate, such as polyethylene terephthalate, are frequently used to store carbonated beverages. At an initial $CO_2$ level of 4.2 cc/mL beverage, a 300 mL bottle manufactured from a polyethylene terephthalate preform containing 21 g polymer has a shelf life of 8.6 weeks, as shown in Table 1 below. At the end of this period, the $CO_2$ level has declined to 3.4 cc/mL, a decline in carbonation level of about 20%. At an initial $CO_2$ level of 4.2 cc/mL beverage, the carbonation level in a beverage stored in a 300 ml bottle manufactured from a 14.5 g polyethylene terephthalate preform declines by 20% in 5.3 weeks.

TABLE 1

Shelf life of carbonated beverages in 300 mL PET bottles at an initial carbonation level of 4.2 cc/mL

| Preform Type | Preform Weight | Interlayer | Interlayer Content | Time for carbonation level to decline 20% |
|---|---|---|---|---|
| Monolayer | 21 g | — | 0% | 8.6 weeks |
| Multilayer | 16 g | 100% MXD6 | 4% | 15.9 weeks |
| Multilayer | 14.5 g | 100% MXD6 | 5% | 16.3 weeks |
| Multilayer | 14.5 g | 100% MXD6 | 3% | 11.8 weeks |
| Monolayer | 14.5 g | — | 0% | 5.3 weeks |

Shelf life of a bottled carbonated beverage may also be improved by increasing the volume of the bottle, as shown in FIG. 1. While maintaining a similar wall thickness in the final polyester bottle, the ratio of surface area to bottle volume (A/V) declines from about 1.25 $cm^{-1}$ at a bottle volume of ~200 mL to ~0.6 $cm^{-1}$ at a bottle volume of ~2000 mL. Simultaneously, the shelf life in weeks increases from 4 weeks at a bottle volume of 200 mL to 18 weeks at a bottle volume of ~2000 mL. However, for some applications, a small bottle volume is desirable. In particular, bottles which have volumes of 37.5 mL to 105 mL, or about 1.25-3 oz., may be desirable in some cases. Based on the data in FIG. 1, such bottles, if formed from a monolayer preform, would be expected to have a poor shelf life.

One way of improving the shelf life of a carbonated beverage in a less than 100 mL bottle, or a 1.25-3 oz. bottle, is to reduce the initial carbonation level. For example, a 1.25 oz., 1.5 oz., 2 oz., or 3 oz. bottle made from a polyethylene terephthalate preform weighing 4 g to 21 g may be used to store a beverage with an initial $CO_2$ level of ca. 2 cc/mL, with a decline in carbonation level of 6% to 12% over a 10-week period. However, such a reduction in carbonation level is undesirable. Alternatively, the shelf life of a carbonated beverage in a 1.25 oz., 1.5 oz., 2 oz., or 3 oz. bottle may be improved by increasing the preform weight, and thus the wall thickness of the final bottle. However, this requires use of increased amounts of plastic as a raw material and is economically and environmentally undesirable.

Figure 2:
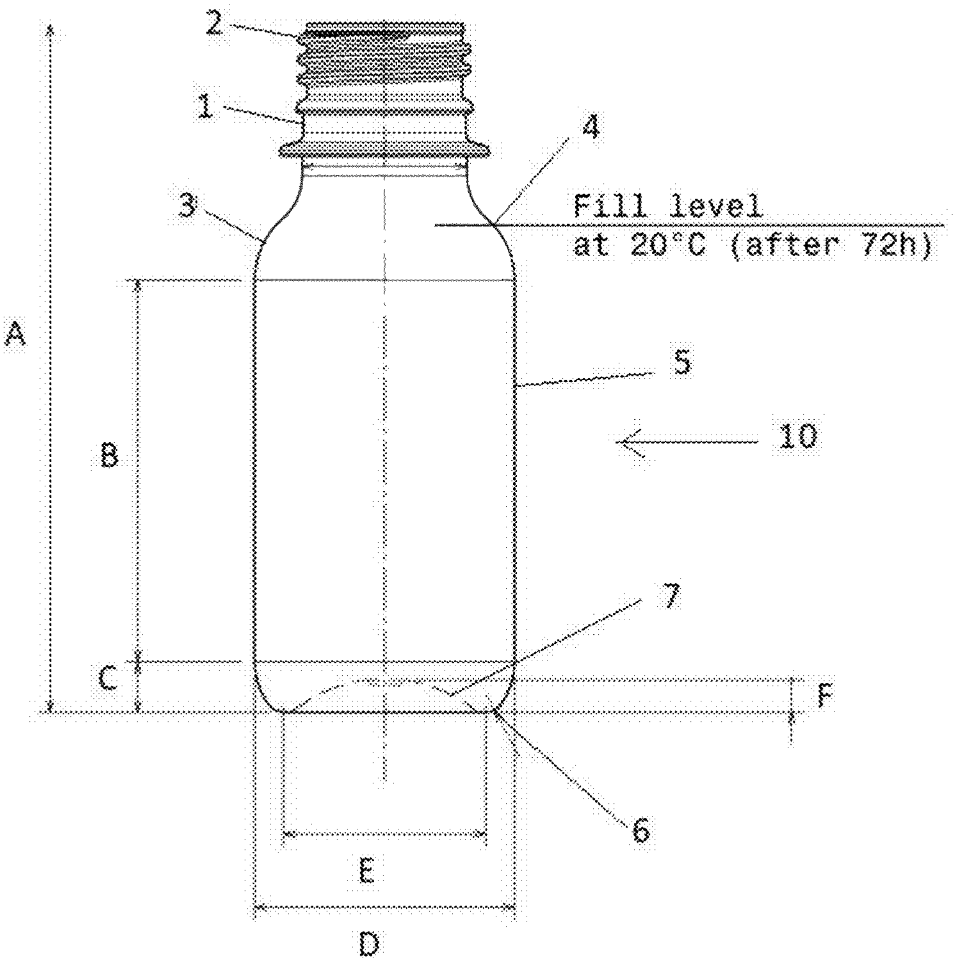
FIG. 2 illustrates a bottle as disclosed in the present specification.

FIG. 2 shows a bottle 10 having a height A as disclosed in the present specification, where the bottle has a mouth 1, which may have an outer surface with threading 2, where threading 2 is configured to receive a screw-on cap with an interior threading. In some embodiments, mouth 1 may have a ridge or depression configured to receive a snap on cap having a corresponding feature.

Bottle 10 includes a tubular sidewall 5 having a diameter D, and a bottom 6. Bottom 6 may include a punt or indentation 7. In some embodiments, diameter D is greater than the diameter of mouth 1, and a shoulder 3 connects mouth 1 and sidewall 5. A standard fill capacity, measured at fill level 4, of bottle 1 may be 30 mL to 120 M, 37.5 mL to 105 M, from 60 mL to 102.5 mL, from 80 mL to 100 mL, or from 87 mL to 90 mL. Fill level 4 may be on shoulder 3, about halfway between mouth 1 and sidewall 5 of bottle 10. The height B of tubular sidewall 5 and the diameter D of sidewall 5 may be selected to provide the desired fill capacity, measured at 20° C. after 72 hours storage.

While the entire height of tubular sidewall 5 may be a right cylinder of constant diameter if desired, the bottom portion sidewall 5, having a height C, is normally curved inward, as shown in FIG. 2. Similarly, the bottom 6 of bottle 10 may be flat, but normally features an indented punt 7 having a height F and diameter E. The presence of a curved lower sidewall and a punt 7 provides more even distribution of plastic at the bottom of the bottle during the blow molding process and reduces the likelihood that a preform used for forming a bottle will blow out or burst during blow molding. If a straight sidewall 5 and a flat bottom 6 are used, less plastic may be present at the edge connecting sidewall 5 and bottom 6, increasing the likelihood of blowouts.

Figure 3:
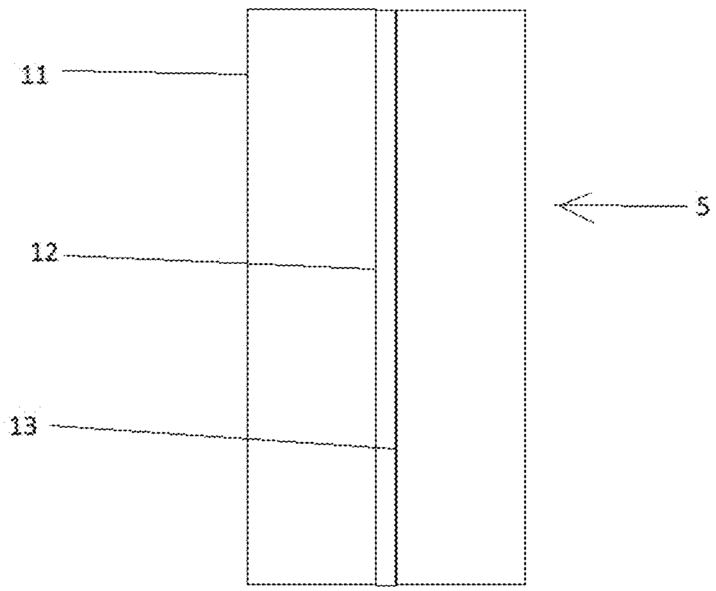
FIG. 3 illustrates the laminated sidewall of the bottle of FIG. 2 (not to scale)

FIG. 3 shows a detail of the laminated sidewall 5 of bottle 10. The sidewall 5 includes an outer layer 11 formed from polyethylene terephthalate, an intermediate gas barrier layer 12, and an inner layer 13 formed from polyethylene terephthalate. The intermediate gas barrier layer 12 is formed from a polyamide comprising a dicarboxylic acid component and the diamine m-x-xylylenediamine. The dicarboxylic acid component may be an aliphatic diacid of formula II, where n is 1 to 5, 2 to 4, or 2 to 3; a benzenedicarboxylic acid, e.g., terephthalic acid, isophthalic acid, or a mixture thereof; or a mixture thereof.

$$HO_2C—(CH_2)_{2n}—CO_2H \qquad II$$

The dicarboxylic acid component of the polyamide may be adipic acid in combination with terephthalic acid, isophthalic acid, or a mixture thereof. The dicarboxylic acid component may be 40% to 100%, 50% to 90%, 60% to 80%, or about 70% adipic acid, and from 0% to 60%, 10% to 50%, 20% to 40%, or about 30% of terephthalic acid, isophthalic acid, or a mixture thereof. The dicarboxylic acid component may be 100% adipic acid. The gas barrier layer 12 may be made from 100% MXD6, which is made by polymerizing m-xylylenediamine with adipic acid as the sole acid component. In various embodiments, the intermediate gas barrier layer 12 has a thickness which is 3%, 4%, 5%, 6%, or 7% of the total thickness of sidewall 5, or from 3% to 7% of the total thickness of sidewall 5.

Referring back to Table 1, a laminated 300 ML multilayer bottle with an inner layer of polyethylene terephthalate, an inner layer of polyethylene terephthalate, and an intermediate gas barrier layer of 100% MXD6 has superior resistance to $CO_2$ gas transmission across the bottle wall. A 300 mL, bottle made from a 21 g polyester monolayer preform has a shelf life of 8.6 weeks before the carbonation level in the bottle has declined by 20% from an initial value of 4.2 cc/mL beverage. A 300 mL multilayer bottle made from a 16 g preform containing an MXD6 interlayer, where the interlayer is 4% of the total mass of the bottle, has a shelf life of 15.9 weeks. Thus, the 16 g multilayer preform uses 24% less plastic than the monolayer preform and increases the shelf life of the carbonated beverage in the bottle by 85%. Similar reductions in the amount of plastic used are expected for smaller volume bottles.

Table 1 also shows results obtained with 300 mL polyester bottles formed from three different 14.5 g preforms. As noted above, at an initial CO2 level of 4.2 cc/mL beverage, the carbonation level in a beverage stored in a 300 mL bottle manufactured from a 14.5 g polyethylene terephthalate monolayer preform declines by 20% in 5.3 weeks. If an MXD6 interlayer is incorporated into the 14.5 g preform in an amount of 3%, based on the total mass of the preform, the carbonation level in the beverage declines by 20% in 11.8 weeks, more than doubling the shelf life of the beverage in the bottle. If the MXD6 interlayer is used in an amount of 5%, based on the total mass of the preform, the carbonation level in the beverage declines by 20% in 16.3 weeks, essentially tripling the shelf life of the beverage. The 14.5 g multilayer preform uses 31% less plastic than a 21 g monolayer preform and increases the shelf life of the carbonated beverage in the bottle. If the MXD6 interlayer in the 14.5 g preform ranges from 3% to 5% of the preform mass, the shelf life of the carbonated beverage in the resulting bottle increases from 37% to 90%, relative to a beverage stored in a 21 g monolayer preform. Thus, the use of an MXD6 interlayer in a laminated polyester bottle in an amount of 3% to 7%:

- allows production of bottles more economically, through the use of less plastic per bottle;
- extends the shelf life of a carbonated beverage contained within the bottle; and/or
- reduces the impact of polyester bottles on the environment, by reducing the level of plastic waste.

Polyamides formed from m-xylylenediamine have superior resistance to carbon dioxide, hydrogen, oxygen, and nitrogen transmission through the wall of the bottle, and prevent degradation of nutrients and flavors, when compared to other polymers. For example, nylon 6 and nylon 6,6 have excellent oxygen barrier properties but are permeable to carbon dioxide (Tsai et al., *Desalination* 233 (2008), 183-190). Nylon 6 and nylon 6,6 are commonly used in packaging food products, where it is desirable to prevent oxygen permeation into the package while allowing carbon dioxide formed during storage to escape ("Nylon Films," *Polymer Properties Database*, URL: http://polymerdatabase.com/Films/Nylon %20Films.html). Thus, nylon 6 and nylon 6,6 are not suitable for maintaining carbonation levels in a carbonated beverage. Additionally, nylon 6 and nylon 6,6 exhibit unacceptably high oxygen transmission rates, and can allow oxygen to diffuse into the bottle as carbon dioxide diffuses out of the bottle (Soltani et al., *Food Packaging,* 2017, Pages 1-43; see FIG. 1.2). Entry of oxygen into the bottle may affect flavor, due to oxidation of flavoring agents. More importantly, entry of oxygen into the bottle may oxidize important biologically effective constituents of the beverage, e.g., caffeine and creatine, which would produce undesirable side products.

Figure 4:
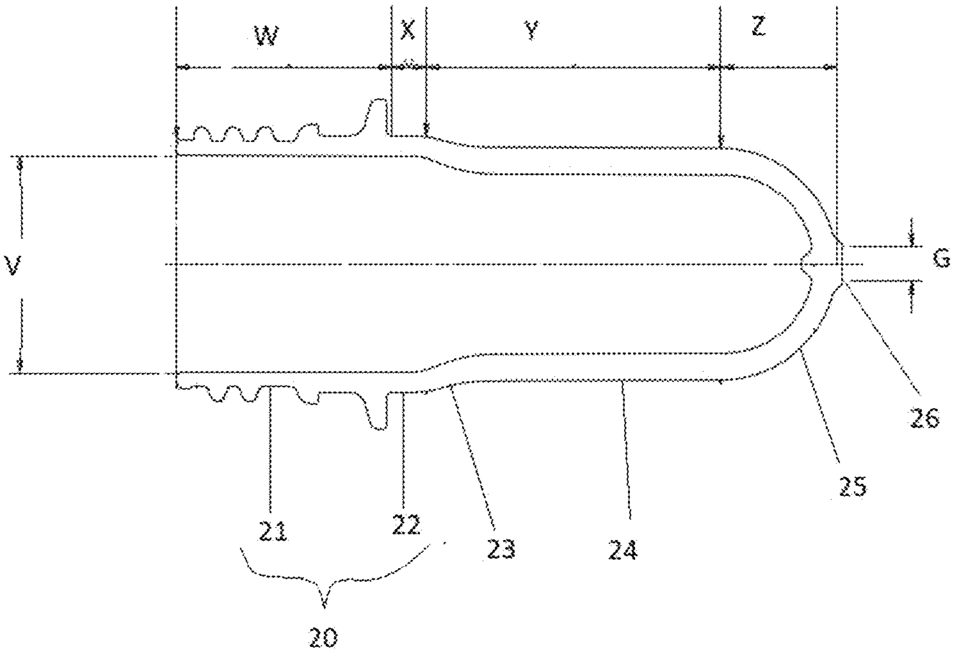
FIG. 4 illustrates a preform for the bottle of FIG. 2.

Referring back to FIG. 1, as the bottle volume declines below 500 mL, the area/volume ratio A/V increases dramatically, and the shelf life of a carbonated beverage contained within the bottle declines precipitously. As seen in Table 1, increasing the mass of a monolayer preform used for forming a 300 mL bottle from 14.5 g to 21 g increases the shelf life of the carbonated beverage by about 62%. This is due to increased wall thickness of the resulting bottle. In the preforms used in the examples of Table 1, all preforms have mouths 20 of identical shapes, as shown in FIG. 4. During the process of blow molding the preform of FIG. 2 into a bottle of FIG. 2 with mouth 3, the shape of the preform mouth is essentially unchanged. Approximately 5.1 g of the mass of the 14.5 g preform and of the 21 g preform is taken up by mouth 20. As a result, the walls and bottom of a bottle formed from a 21 g preform contain 15.9 g polymer, while the walls and bottom of a bottle formed from a 14.5 g preform contain 9.4 g polymer, or 41% less polymer than the bottle formed from the 21 g preform. The bottle formed from the 21 g preform has thicker walls, and reduced carbon dioxide, hydrogen, and nitrogen transmission, as shown in Table 1.

However, increasing the preform mass is not the only way to increase wall thickness. If the preform mass is held constant, and the volume of the bottle produced from the preform decreases from an initial value of 300 mL to a final value of, e.g., 37.5 mL to 105 mL, the sidewalls and bottom of the smaller bottle will have a smaller area than the sidewalls and bottom of the 300 mL bottle but contain the same amount of polymer as the larger bottle. This increases the thickness of the wall of the smaller bottle, relative to the 300 mL bottle, and increases the resistance of the smaller bottle to carbon dioxide, hydrogen, and nitrogen transmission through the bottle wall.

If a preform weighing from about 4 grams to 22 grams, 13 grams to 22 grams, from 14.5 to 21 grams, from 14.5 to 18 grams, from 15 to 18 grams, from 15 to 17.5 grams, or from 13 to 16 grams which is suitable for manufacturing a 300 mL bottle is instead used to manufacture a 37.5 mL, to 105 mL bottle, carbon dioxide, hydrogen, and nitrogen transmission from the bottle decreases due to increased wall thickness. If the preform additionally contains from 3% to 7% by mass of an MXD6 polyamide interlayer, carbon dioxide, hydrogen, and nitrogen transmission from the bottle further decreases due to the gas barrier layer.

FIG. 4 shows a preform for a bottle of FIG. 2. The preform includes a mouth 20, including a threaded opening 21 having height W and a neck 22 having height X. A tubular portion 24, upon blow molding, is adapted to form tubular sidewall 5 in the bottle of FIG. 2. A tapered portion 23 of the preform, upon blow molding, is adapted to form shoulder 3 in the bottle of FIG. 2. Portions 23 and 24 of the preform collectively have height Y. The preform has a hemispherical bottom 25 with a radius Z, configured to form the bottom of the bottle of FIG. 2 upon blow molding. Preforms of FIG. 4 are normally formed by injection molding. The preform of FIG. 4 may include a thickened portion 26 in bottom 23, which is normally along an axis of the preform. Portion 26 has a width G and corresponds to the gate in the injection mold used to form the preform. Like the final blow molded bottle of FIG. 2, the preform includes an outer layer formed from polyethylene terephthalate, an intermediate gas barrier layer, and an inner layer formed from polyethylene terephthalate.

Figure 5:
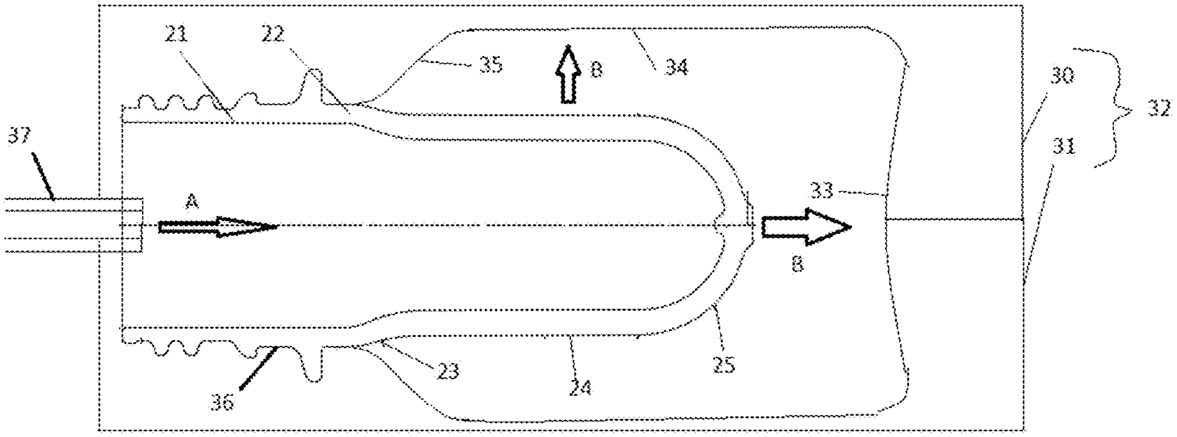
FIG. 5 illustrates formation of a bottle of FIG. 2 by blow molding a preform of FIG. 4.

FIG. 5 illustrates conversion of a preform of FIG. 4 into a bottle of FIG. 2. The preform of FIG. 4 is placed in a mold 32, including a first mold half 30 and a second mold have 32. Mold halves 30 and 31 together form a mold cavity. The mold cavity includes a neck portion configured to tightly engage portions 21 and 22 of preform neck 20. The mold cavity includes a portion 35 having a shape corresponding to the shoulder 3 of the final bottle, a tubular portion 34 corresponding to the sidewall 5 of the final bottle, and a bottom 33, which may be concave, as shown in FIG. 5, or planar. As seen in FIG. 5, the volume of the mold cavity is larger than the volume of preform 5. The preform is heated to soften the plastic forming the preform wall, and air is injected through hose 37 into the preform, in the direction of arrow A. The increased pressure inside the preform causes the wall of the preform to expand toward the surface of the mold cavity, in the direction of arrows B, forming the bottle of FIG. 2.

The preform of FIG. 4 is manufactured by a multi-layer "hot runner" process with polyethylene terephthalate and MXD6 being injected into a mold, creating the preform for a bottle. The preform is then converted into a bottle in a blow molder, which expands the preform to a pre-determined bottle shape. The final product is a bottle that can be filled that has an outer layer of polyethylene terephthalate, a layer of MXD6, and an inner layer of polyethylene terephthalate.

Figure 6:
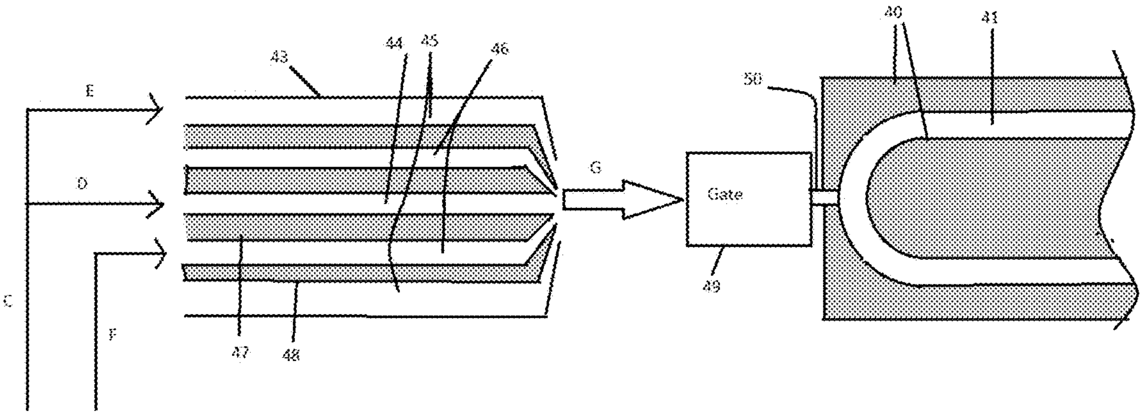
FIG. 6 illustrates formation of a preform of FIG. 4.

FIG. 6 shows a process of manufacturing a preform for use in making a bottle of FIG. 2. A skin polymer stream containing polyethylene terephthalate resin flows in the direction of arrow C toward nozzle 43. Simultaneously, a core polymer stream containing MXD6 resin flows in the direction of arrow F toward nozzle 43. Nozzle 43 includes:

An inner skin polymer passage 44;

An annular core polymer passage 46 surrounding skin polymer passage 44; and An outer annular skin polymer passage 45 surrounding core polymer passage 46.

A barrier 47 separates skin polymer passage 44 and core polymer passage 46, and a barrier 48 separates skin polymer passage 45 and core polymer passage 46.

As shown in FIG. 6, the MXD6 core polymer stream flows in the direction of arrow F into the annular core polymer passage 46. The polyethylene terephthalate skin polymer stream may be divided, and then flows in the direction of arrow D into the inner skin polymer passage 44, and in the direction of arrow E into the outer annular skin polymer passage 45. The flow rate of the MXD6 core polymer stream is controlled so that the amount of MXD6 flowing through the nozzle 43 is between 3% and 7% of the total amount of polyethylene terephthalate. A combined polymer stream exits nozzle 43 in the direction of arrow G, and then flows into gate 49. The gate may be a thermal gate or a valve gate. This gate is at a connection point between a mold 40 for forming a preform and a hot runner sprue leading from the nozzle 43.

The combined polymer stream flows into a preform-shaped cavity 41 in mold 40, from gate 49 through a passage 50. The combined polymer stream contains an inner skin polymer stream of polyethylene terephthalate which form the inner surface of the preform wall, and an outer annular skin polymer stream of polyethylene terephthalate which forms the outer surface of the preform wall. An annular core polymer stream of MXD6 separates the inner and outer skin polymer stream and forms a gas barrier layer in the preform.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A blow-molded bottle for a carbonated beverage, the bottle comprising:

a threaded mouth;

a cylindrical side wall;

a bottom; and a standard fill capacity of 37.5 mL to 105 mL;

wherein the bottle has a ratio of surface area to volume in the range of 1.1 to 1.3 $cm^{-1}$;

wherein the bottom portion of the sidewall is curved inward;

wherein the diameter of the side wall is greater than the diameter of the mouth;

wherein the bottle is blow-molded from a laminated preform;

wherein the laminated preform comprises:

an outer layer formed from polyethylene terephthalate, an intermediate gas barrier layer formed from a polyamide comprising a dicarboxylic acid component and a diamine component comprising m-xylylene-diamine; and an inner layer comprising polyethylene terephthalate;

wherein the laminated preform weighs from about 13 to 16 grams; and wherein the blow-molded bottle extends the shelf life of the carbonated beverage by 37%-90% when compared to the same beverage stored in a comparative bottle made from a 21 g monolayer preform comprising a single polyethylene terephthalate layer;

has superior resistance to hydrogen, nitrogen, and $CO_2$ transmission, when compared to a comparative bottle with a standard fill capacity of 75 mL to 105 mL that is blow-molded from a comparative preform comprising a single polyethylene terephthalate layer and a weight of about 14.5 to 21 grams;

wherein the intermediate gas barrier layer provides 3% to 5% of the total mass of the preform.

2. The blow-molded bottle of claim 1, wherein the dicarboxylic acid component of the polyamide is an aliphatic dicarboxylic acid having an even number of between 6 and 10 carbon atoms, an isomer of benzenedicarboxylic acid, or a mixture thereof.

3. The blow-molded bottle of claim 2, wherein the dicarboxylic acid component of the polyamide comprises adipic acid, alone or in combination with an isomer of benzenedicarboxylic acid.

4. The blow-molded bottle of claim 2, wherein the dicarboxylic acid component of the polyamide is adipic acid.

5. The blow-molded bottle of claim 1, wherein the bottom has a punt.

6. The blow-molded bottle of claim 1, wherein the wall and base of the blow-molded bottle are 12% to 47% thinner than a wall and a base of the comparative bottle.

7. The blow-molded bottle of claim 1, wherein:

the bottle has a volume of 75 to 105 mL;

the laminated preform weighs 15 grams;

the wall and base of the blow-molded bottle are 20% to 41% thinner than a wall and a base of the comparative bottle; and the comparative bottle has a volume of 75 to 105 mL, and is blow-molded from the comparative preform, wherein the comparative preform weighs 15 grams.

* * * * *